United States Patent [19]

Yoldas

[11] Patent Number: 4,465,739

[45] Date of Patent: Aug. 14, 1984

[54] SUBSTRATES COATED WITH ALUMINUM OXIDE SOLUTIONS

[75] Inventor: Bulent E. Yoldas, Churchill, Pa.

[73] Assignee: Westinghouse Electric Corp., Pittsburgh, Pa.

[21] Appl. No.: 434,150

[22] Filed: Oct. 13, 1982

Related U.S. Application Data

[63] Continuation of Ser. No. 293,820, Aug. 17, 1981, abandoned.

[51] Int. Cl.$^3$ .................. B32B 15/00; B05D 3/02
[52] U.S. Cl. ................... 428/432; 427/162; 427/163; 427/165; 427/169; 427/372.2; 428/702
[58] Field of Search ............... 427/162, 372.2, 163, 427/165, 169; 428/432, 702; 350/164

[56] References Cited

U.S. PATENT DOCUMENTS 4,272,588  6/1981  Yoldas et al. .................. 428/433
4,361,598  11/1982  Yoldas ........................... 427/74

*Primary Examiner*—Thurman K. Page
*Attorney, Agent, or Firm*—R. D. Fuerle

[57] ABSTRACT

Disclosed is a method of preparing a clear partially hydrolyzed aluminum alkoxide solution by mixing an aluminum alkoxide with about 0.4 to about 1 moles of water per mole of aluminum alkoxide in the presence of sufficient alcohol to give a maximum weight percent of equivalent alumina of 10%. The mixture is then heated until clear, which typically requires a temperature of about 40° to about 60° C. Then sufficient additional water is added to bring the number of moles of water per mole of alkoxide up to at least about 2. The water is added in the presence of sufficient alcohol to give a maximum weight percent of equivalent alumina of about 3%. A polymerized alumina glass can be prepared from the composition by heating it to a temperature of at least 500° C.

18 Claims, No Drawings

SUBSTRATES COATED WITH ALUMINUM OXIDE SOLUTIONS

CROSS REFERENCE TO RELATED APPLICATIONS

This is a continuation of U.S. patent application Ser. No. 293,820 filed Aug. 17, 1981 now abandoned.

U.S. patent application Ser. No. 931,346, filed Aug. 8, 1978, abandoned in favor of U.S. patent application Ser. No. 065,706 filed Aug. 10, 1979, abandoned in favor of U.S. patent application Ser. No. 200,164, now U.S. Pat. No. 4,361,598, titled "Polymerized Solutions For Depositing Optical Oxide Coatings," by B. E. Yoldas discloses the preparation of titanium and tantalum glasses containing small amounts of silicon or other metal ions from alkoxide solutions.

U.S. patent application Ser. No. 264,323 filed May 18, 1981, by B. E. Yoldas, titled "Predetermined and Enhanced Densification In Sintered Metal Oxides," discloses the preparation of dense alumina powders from aluminum alkoxide solutions.

BACKGROUND OF THE INVENTION

A process has recently been discovered for preparing polymerized metal oxide glasses of titanium or tantalum from solutions of their alkoxides. This process has the advantage that the coatings can be prepared at relatively low temperatures from solutions of carefully controlled compositions. The resulting coatings can be made to have a particular index of refraction by controlling the composition.

However, until now the compositions were limited to those containing principally titanium and tantalum alkoxides. It was not possible, for example, to prepare a polymeric alumina glass from an aluminum alkoxide, although alumina powders could be prepared from an aluminum alkoxide solution.

SUMMARY OF THE INVENTION

I have discovered how to make a clear solution of an aluminum alkoxide from which a polymerized alumina glass can be formed. While the process of this invention requires that certain parameters be carefully controlled, the process itself is not difficult to perform and can be carried out with relatively inexpensive equipment. Unlike prior alumina solutions which were prepared from hydroxides of alkoxides in water and peptizing the resulting precipitate by using an acid, the alumina solutions of this invention are prepared in alcohol in the absence of acid. Also, they are not cloudy or translucent like the former solutions, but can be made perfectly clear, indicating the absence of light-scattering particles. The polymerized alumina glasses of this invention can be prepared from these solutions in bulk or as coatings.

PRIOR ART

An article by B. E. Yoldas in the Journal Of Material Science, Volume 12, 1977, pps. 1203 to 1208, titled "Preparation Of Glasses And Ceramics From Metal-Organic Compounds," discloses the hydrolysis of aluminum secondary butoxide to form aluminum oxide which then decomposes under heat to form alumina.

U.S. Pat. No. 3,357,791 discloses a process for preparing colloidal size particles of alpha alumina monohydrate from aluminum alkoxides.

An article by Bulent E. Yoldas in the Journal Of Applied Chemistry And Biotechnology, Volume 23, 1973, pps. 803 to 809, titled "Hydrolysis Of Aluminum Alkoxides And Berrite Conversion," discloses the hydrolysis of aluminum alkoxides to form aluminum hydroxides which are then polymerized to form alumina.

U.S. Pat. Nos. 3,944,658 and 3,941,719 disclose the preparation of a non-particulate alumina from aluminum alkoxides in the presence of an acid.

DESCRIPTION OF THE INVENTION

In the process of this invention a composition is first prepared of an aluminum alkoxide, an alcohol, and water. The aluminum alkoxides suitable for use in this invention have the general formula $Al(OR)_3$, where R is alkyl to $C_6$. Preferably, R is secondary butoxide because aluminum secondary butoxide is a liquid and is inexpensive.

The alcohol used in the composition should be water-free and a solvent for the aluminum alkoxide. Also, the alcohol should preferably be the same alcohol that is formed when the aluminum alkoxide is hydrolyzed, so that it is not necessary to separate two different alcohols. That is, the alcohol would preferably have the formula ROH where R is the same R that is present in the aluminum alkoxide. Higher boiling alcohols are preferred as higher temperatures can then be used to form the composition without boiling off the alcohol. However, generally, the alcohol is chosen on the basis of cost and the properties of the liquid desired for a particular application.

In forming the composition the aluminum alkoxide and the water should only be mixed in the presence of the alcohol. That is, the alcohol may be mixed with the alkoxide first followed by the addition of the water or, in the preferred procedure, the alcohol and the water are mixed together first and then the alkoxide is added. The addition of the water directly to the alkoxide should be avoided as it can result in an inhomogenous hydrolyzation of the alkoxide.

The amount of water used in the composition is highly critical as if less than about 0.4 or more than about 1 mole of water is used per mole of alkoxide the liquid will contain precipitate and will not form a clear solution. The maximum amount of aluminum alkoxide in the initial solution, calculated as equivalent $Al_2O$ by weight, should not exceed 12 percent as a higher concentration will result in an incomplete dissolution of precipitate and an unclear solution. It is not necessary for any acid to be present in the composition and preferably no acid should be used.

Once the alkoxide, alcohol, and water have been mixed a precipitate will form which must be redissolved. This can be accomplished by heating the composition until it clears. The composition is preferably heated to at least 40° C. as lower temperatures require too much time for the composition to clear. The composition is preferably not heated to temperatures greater than 60° C., however, as at higher temperatures alcohol is evaporated, although higher temperatures will still dissolve the precipitate as long as the water concentration is between about 0.4 to about 1.0 moles/mole alkoxide.

Once the liquid is clear it may be necessary to add additional water in order to complete the hydrolysis. The additional water introduced should preferably be sufficient to raise the moles of water to moles of alkoxide ratio to about 2 to about 3 as at a ratio of less than about 2 the solution will contain a large number of unhydrolyzed alkyl bonds which result in the deposition of carbon during the pyrolysis. At a ratio of greater than about 3 the composition tends to gel at low temperatures which makes coating difficult, although the resultant alumina is clear. The additional water that is added should preferably be in alcohol to avoid contacting the solution with high concentrations of water. Sufficient alcohol is preferably mixed with the additional water so that the aluminum alkoxide in the composition, calculated as equivalent alumina, is not more than 3 percent as higher concentrations may produce a gel. This alumina solution may be combined with other alkoxides or various other solutions to obtain a wide variety of glass or ceramic compositions.

The completed solution is stable and can be stored until it is ready to be used. To use the solutions to prepare alumina coatings the solution can be sprayed, dipped, or otherwise applied to the surface of any substrate which can withstand the curing temperature. The alumina coatings of this invention are useful for protecting surfaces, for passivation of surfaces, as a desiccant, an antireflective coatings on surfaces, an optical coatings, or for other purposes. Bulk glass or ceramic objects can also be prepared from the solution by gelling it alone or with additions, then drying and curing.

In order to remove water, alcohol, and residual organics which are still present in the composition, the composition must be heated at at least 400° to 500° C. until these compounds are no longer emanate from it and a pure oxide is attained. The cured oxide is totally transparent and, unlike prior aluminum oxide prepared from aqueous alkoxide derived solutions, is not cloudy.

The following example further illustrates this invention.

EXAMPLE 1

Samples were made by adding various amounts of water to 140 g of dry ethyl alcohol, then adding 24.8 g (0.1 m) of $Al(OC_4H_9)_3$ into these liquids. The samples were kept at 50° C. for 2 hours. The following table gives the results.

| Sample # | H$_2$O (m/moles alk) | Condition of sample After 2 hrs at 50° C. |
|---|---|---|
| 1 | 0.15 (.27 g) | Undissolved precipitate |
| 2 | 0.30 (.54 g) | Undissolved precipitate |
| 3 | 0.40 (.72 g) | Cleared, slight precipitate |
| 4 | 0.52 (.90 g) | Totally clear |
| 5 | 0.70 (1.26 g) | Totally clear |
| 6 | 1.00 (1.80 g) | Totally clear |
| 7 | 1.20 (2.16 g) | Some precipitate remaining at bottom |
| 8 | 1.50 (2.70 g) | Milky |
| 9 | 2.00 (3.60 g) | Milky |

The table shows that the only samples which cleared were those which had between 0.4 and 1.0 moles of water per mole of alkoxide.

EXAMPLE 2

In these experiments, 2.34 g (1.3 m/m) H$_2$O was mixed with 140 g alcohol and this mixture was added to sample #5 from Example 1, which contained about 3% equivalent Al$_2$O$_3$. The solution remained clear. It now had a water content of 2 moles/per mole of alkoxide, and an alkoxide content of 1.5% eqivalent Al$_2$O$_3$.

A glass slide was dipped into the solution and was heated to 600° C. to form a clear polymerized alumina coating.

EXAMPLE 3

Example 1 was repeated using 1 g of water and 25 g of aluminum secondary butoxide to show the effect of altering the concentration of alkoxide in the solution. The following table gives the results.

| Sample | Ethyl Alcohol | % eg. Al$_2$O$_3$ | Condition After 2 hrs at 50° C. |
|---|---|---|---|
| 1 | 100 g | 4% | Clear |
| 2 | 58 g | 6 | Clear |
| 3 | 37 g | 8 | Clear |
| 4 | 24 g | 10 | Clear |
| 5 | 15 g | 12 | Some precipitate |
| 6 | 7 g | 14 | Cloudy |

The above table shows that the maximum equivalent Al$_2$O$_3$ concentration in the initial solution should be 10% or less.

EXAMPLE 4

Sample 1 in Example 3 was prepared using isopropyl and sec-butyl alcohol instead of ethyl alcohol. Clear solutions resulted. When a clear solution is produced a clear oxide coating can always be produced by adding the additional water and heating to at least 500° C. However, if the solution is to be used, along with other oxide constituents, as a source of alumina, then the solution can be used without introducing additional water before mixing with other components.

I claim:

1. A method of forming a polymerized Al$_2$O$_3$ coating on a substrate comprising preparing a clear partially hydrolyzed aluminum alkoxide solution by
   (A) mixing Al(OR)$_3$ with about 0.4 to about 1 mole of water per mole of Al(OR)$_3$ in the presence of sufficient alcohol to give a maximum weight % of equivalent Al$_2$O$_3$ of 10% where R is alkyl to C$_6$;
   (B) applying said solution to a surface of a substrate; and
   (C) heating said solution on said surface to at least about 400° C.

2. A method according to claim 1 including the additional last step of adding sufficient additional water to bring the number of moles of water per mole of alkoxide up to at least about 2, in the presence of sufficient alcohol to give a maximum weight % of equivalent Al$_2$O$_3$ of about 3%.

3. A method according to claim 1 wherein R is secondary butoxide.

4. A method according to claim 1 wherein said mixture is heated at about 40° to about 60° C.

5. A method according to claim 2 wherein in said additional last step the number of moles of water per mole of alkoxide is about 2 to about 3.

6. A method according to claim 1 wherein said water is mixed with said alcohol and that mixture is mixed with said alkoxide.

7. A method according to claim 1 wherein said alcohol and said alkoxide are mixed prior to the addition of said water.

8. A method according to claim 1 wherein said alcohol is ROH and the R group in said alcohol is the same as the R group in said alkoxide.

9. A method according to claim 1 wherein said alcohol is selected from the group consisting of ethanol, propanol, butanol, and mixtures thereof.

10. A polymerized $Al_2O_3$ coating on a substrate formed according to the method of claim 1.

11. A solution according to claim 1 wherein
said method includes the additional last step of adding sufficient additional water to bring the number of moles of water per mole of alkoxide up to at least about 2, in the presence of sufficient alcohol to give a maximum weight % of equivalent $Al_2O_3$ of about 3%.

12. A solution according to claim 1 wherein R is secondary butoxide.

13. A solution according to claim 1 wherein said mixture is heated to about 40° to about 60° C.

14. A solution according to claim 11 wherein in said additional last step the number of moles of water per mole of alkoxide is about 2 to about 3.

15. A solution according to claim 1 wherein said water is mixed with said alcohol and that mixture is mixed with said alkoxide.

16. A solution according to claim 1 wherein said alcohol and said alkoxide are mixed prior to the addition of said water.

17. A solution according to claim 1 wherein said alcohol is ROH and the R group in said alcohol is the same as the R group in said alkoxide.

18. A solution according to claim 1 wherein said alcohol is selected from the group consisting of ethanol, propanol, butanol, and mixtures thereof.

* * * * *